(12) United States Patent
Lundberg

(10) Patent No.: US 7,709,118 B2
(45) Date of Patent: May 4, 2010

(54) RECUPERATED ATMOSPHERIC SOFC/GAS TURBINE HYBRID CYCLE

(75) Inventor: Wayne Lundberg, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 1146 days.

(21) Appl. No.: 10/992,182

(22) Filed: Nov. 18, 2004

(65) Prior Publication Data

US 2006/0105207 A1    May 18, 2006

(51) Int. Cl.
  *H01M 8/00* (2006.01)
  *H01M 8/10* (2006.01)
  *H01M 8/12* (2006.01)
(52) U.S. Cl. .............................. 429/13; 429/26; 429/30
(58) Field of Classification Search ............... 429/12–46
  See application file for complete search history.

(56) References Cited

U.S. PATENT DOCUMENTS

| | | | |
|---|---|---|---|
| 3,972,731 A | 8/1976 | Bloomfield et al. | |
| 4,622,275 A | 11/1986 | Noguchi et al. | |
| 5,413,879 A | 5/1995 | Domeracki et al. | |
| 5,573,867 A | 11/1996 | Zafred et al. | |
| 2004/0013913 A1 | 1/2004 | Fabis et al. | |
| 2004/0150366 A1* | 8/2004 | Ferrall et al. | 320/101 |
| 2004/0224196 A1* | 11/2004 | Pastula et al. | 429/20 |

FOREIGN PATENT DOCUMENTS

WO    WO 02/37587 A2    5/2002

OTHER PUBLICATIONS

Proceedings of the Power-Gen International '96, "Solid Oxide Fuel Cell/Gas Turbine Power Plant Cycles and Performance Estimates", Lundberg, Dec. 4-6, 1996, Orlando FL.
Proceedings of ASME Turbo Expo 2003, "Tubular SOFC Hybrid Power System Status", Veyo, Jun. 16-19, 2003, Atlanta, GA.

* cited by examiner

*Primary Examiner*—Dah-Wei D Yuan
*Assistant Examiner*—Katherine Turner

(57) ABSTRACT

A method of operating an atmospheric-pressure solid oxide fuel cell generator (6) in combination with a gas turbine comprising a compressor (1) and expander (2) where an inlet oxidant (20) is passed through the compressor (1) and exits as a first stream (60) and a second stream (62) the first stream passing through a flow control valve (56) to control flow and then through a heat exchanger (54) followed by mixing with the second stream (62) where the mixed streams are passed through a combustor (8) and expander (2) and the first heat exchanger for temperature control before entry into the solid oxide fuel cell generator (6), which generator (6) is also supplied with fuel (40).

4 Claims, 2 Drawing Sheets

US 7,709,118 B2

RECUPERATED ATMOSPHERIC SOFC/GAS TURBINE HYBRID CYCLE

GOVERNMENT CONTRACT

The Government of the United States of America has rights in this invention pursuant to Contract No. DE-FC 26-97FT34139, awarded by the U.S. Department of Energy.

FIELD OF THE INVENTION

The present invention relates to an integrated gas turbine solid oxide fuel cell system, where inlet air for a solid oxide fuel cell generator is slightly above atmospheric and where inlet air for the generator is temperature controlled to increase flexibility in selecting a gas turbine for integration with the solid oxide fuel cell ("SOFC") generator.

BACKGROUND OF THE INVENTION

Typically, a solid oxide fuel cell generator comprised a plurality of tubular solid fuel cells that react a gaseous fuel, such as reformed natural gas, with air to produce electrical power and a hot exhaust gas. Previously, it has been proposed to integrate such a solid oxide fuel cell generator with a gas turbine, where electrical power is produced by both the solid oxide fuel cell generator and the turbine. Such a system was used with a topping combustor supplied with a second stream of fuel to provide a still further heated hot gas that was then expanded in a turbine, as taught in U.S. Pat. No. 5,413,879 (Domeracki et al.).

There, the system is a pressurized-SOFC-generator/gas turbine (PSOFC/GT) hybrid system. It gets high efficiency (relative to the efficiency of a conventional SOFC power system) because it recovers SOFC exhaust heat and converts a fraction of that heat to electric power, and because it operates the SOFC generator at elevated pressure, which boosts cell voltage, which means the SOFC generator runs at a higher efficiency. However, such a system is both complex and expensive.

A wide variety of integrated SOFC/gas turbine systems have been proposed, in, for example, *Proceedings of the Power-Gen International '96*, "Solid Oxide Fuel Cell/Gas Turbine Power Plant Cycles and Performance Estimates", Wayne L. Lundberg, Dec. 4-6, 1996 Orlando Fla.; and U.S. Pat. No. 5,573,867 (Zafred et al.). A variety of integrated designs have also been used in molten carbonate fuel cell technology, for example, U.S. Pat. Nos. 3,972,731 and 4,622,275 (Bloomfield et al. and Noguchi et al. respectively).

More recently Stephen E. Veyo and Wayne L. Lundberg et al. in the *Proceedings of ASME Turbo Expo* 2003, "Tubular SOFC Hybrid Power System Status", Jun. 16-19, 2003, Atlanta Ga., described current design atmospheric-pressure SOFC/gas turbine ("ASOFC/GT") hybrid cycle systems, as well as a turbocharged SOFC hybrid cycle, among others. There, in the ASOFC/GT design (shown in FIG. 1) cycle air is taken in at a gas turbine compressor, and preheated with SOFC exhaust heat recovered at a single recuperator. This reduces the gas turbine combustor fuel requirement to achieve a prescribed turbine inlet temperature (TIT), and raises the system cycle electric efficiency. The oxidant for the SOFC module is the turbine exhaust, which will typically be at a pressure that is approximately 1-3 psi above the atmospheric pressure. Thus, an advantage of the system is that the module will not require the complication and expense of design for pressurization, and a module with features from a conventional atmospheric-pressure SOFC power system could be employed.

Systems based on the ASOFC/GT cycle will not be limited to a particular electric power capacity, and it is expected that capacities ranging from circa 100 kwe's to multi-MWe's will be feasible. Further, electric efficiencies (net AC/LHV) of approximately 52% are expected from ASOFC/GT systems. The system could also incorporate a heat export feature, giving it combined heat and power capabilities. For an ASOFC/GT system configured as shown in the article (and FIG. 1), the gas temperature at the turbine expander exhaust must be the oxidant temperature that is required at the SOFC module inlet, and for this to occur, the GT pressure ratio and TIT at GT rating will therefore be restricted to combinations that will result in the required module inlet temperature, or the GT must be operated off-design to achieve the required module inlet temperature. This could limit the number of commercially-available gas turbines that are suited for deployment in a ASOFC/GT system of specified capacity, and if GT off-design operation were required to use a particular GT, reduced system power and efficiency performance could result. Thus, a design issue with power systems that are based on the basic ASOFC/GT cycle is that it is difficult to go out and buy a gas turbine that will provide exactly the air temperature and air flow rate combination that the SOFC generator needs at its inlet to keep its cells running at the right temperature.

What is needed is a modification to the basic ASOFC/GT cycle that would enable the application of gas turbines that did not operate with the preferred expander exhaust temperature under rating conditions, and it could preclude the need to operate the GT off-design for expander exhaust temperature control purposes. It is one of the main objects of this invention to provide a modification to the system that would facilitate easy control of the oxidant temperature between the gas turbine and an associated SOFC module. There is a need to allow the gas turbine in ASOFC/GT made to be less dependent on SOFC module operational requirements.

SUMMARY OF THE INVENTION

The above needs are met and object achieved by providing a method of operating an atmospheric-pressure solid oxide fuel cell generator in combination with a gas turbine comprising a compressor and expander section; where an inlet oxidant is passed through the compressor and exits as a first stream and a second stream, the first stream passing through a flow control valve to control flow and then through a heat exchanger, followed by mixing with the second stream; where the mixed streams are passed through a second heat exchanger, and then a combustor and the expander section of the gas turbine before entry into the solid oxide fuel cell generator, which generator is also supplied with fuel. It is through control of air/oxidant flow through the flow control valve and use of the first heat exchanger that control of the SOFC generator air inlet temperature is achieved.

This invention also resides with an atmospheric-pressure solid oxide fuel cell generator in combination with a gas turbine having a compressor and an expander, where inlet oxidant passes into the gas turbine comprising a compressor and expander section, and exits as a first oxidant stream and a second oxidant stream, where the first air stream passes through a flow control and into a first heat exchanger to be heated and then into the second stream to form a flow controlled, combined, compressed heated oxidant stream which passes to a second heat exchanger to be further heated, to form a flow controlled, further heated oxidant stream which is passed through a combustor and which is passed into the expander of the gas turbine to form an expanded, cooled oxidant stream which is passed through another heat exchanger, preferably the first heat exchanger, to be further cooled, to provide a flow-controlled, heat-adjusted, feed oxidant stream, having the temperature and pressure required to be a fuel cell generator oxidant feed, which is then passed to a solid oxide fuel cell generator containing a plurality of tubular solid oxide fuel cells having electrodes on opposite sides of a solid oxide electrolyte which fuel cells operate on oxidant and fuel to generate electricity, effecting adjustment and control of the feed air stream in terms of temperature at the oxidant inlet.

This system will provide the system designer with more flexibility, control and options by increasing the variety/number of gas turbines that are candidates for deployment in a ASOFC/GT system. The flow control valve coupled with the first heat exchanger (recuperator) controls temperature at point of entry in the SOFC. The term "atmospheric-pressure" as used herein means from 1.0 to about 1.2 atmospheres (14.7 psia-17.7 psia). The temperatures at the SOFC generator air inlet will be in the range of about 500° C. to about 700° C., depending upon the SOFC generator operating point. The air mass flow rate at the SOFC generator air inlet will be 1 kg/sec and higher, depending upon the power system capacity. The bigger the capacity, the higher the flow requirement.

BRIEF DESCRIPTION OF THE DRAWINGS

The above and other advantages of this invention will be more apparent from the following description in view of the drawings, where.

DESCRIPTION OF THE PREFERRED EMBODIMENTS

Figure 1:
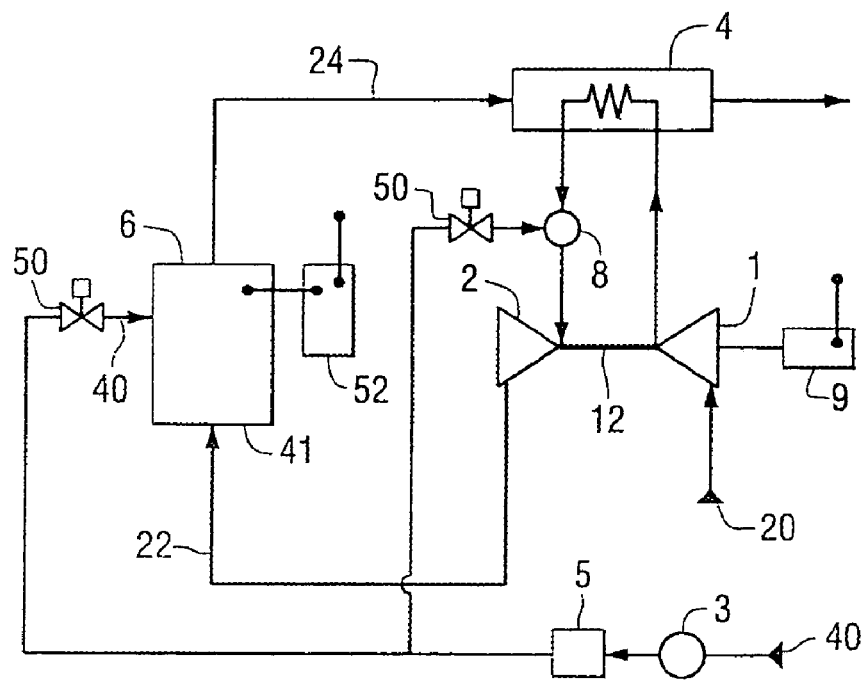
FIG. 1 is a schematic diagram of a prior art, basic ASOFC/GT power system cycle.

Referring to the drawings, there is shown in FIG. 1 an integrated gas turbine solid oxide fuel cell system according to the prior art. The major components of the system are a gas turbine generator with a compressor 1, a turbine expander 2, a rotor 12 by which the turbine drives the compressor as well as an electrical generator 9, an optional fuel compressor/pump 3, a fuel desulfurizer 5, a solid oxide fuel cell (SOFC) module generator 6, an optional combustor 8 and recuperator 4, with fuel feeds shown as 40 and 70 and feed air/oxidant shown as 20. Various fuel line valves 50 are shown, as well as power conditioning system 52, commercially available, that converts SOFC DC power to AC power.

The SOFC generator module 6 operates at near atmospheric pressure, as in a conventional SOFC power system. The turbine is indirectly heated by heat recovered from the SOFC module exhaust 24, but the combustor 8 could be also fired for system peak-power operation. The SOFC module receives its module oxidant input 22 from the turbine expander 2 exhaust. Thus, when the turbine combustor is not fired, the oxidant will be normal air, and vitiated air when it is fired. A system based on this cycle will derive electric power from both the SOFC electrochemical process and the conversion of SOFC exhaust heat and gas turbine fuel energy to power by the gas turbine. The principal advantage of the atmospheric-pressure hybrid is its ability to achieve moderately high electric efficiencies while still employing the simpler and less expensive atmospheric-pressure SOFC module package design.

Here, cycle feed air 20 is taken in at the compressor 1, and preheated with SOFC exhaust heat recovered at the recuperator 4. This reduces the gas turbine combustor fuel requirement to achieve a prescribed turbine inlet temperature, and raises the system cycle electric efficiency. The module oxidant 22 for the SOFC module 6 is the turbine exhaust, which will typically be at a pressure that is approximately 1 to 3 psi above the atmospheric pressure. Thus, an advantage of the system is that the module will not require the complication and expense of design for pressurization, and a module with features from a conventional atmospheric-pressure SOFC power system could be employed.

For an ASOFC/GT system configured as indicated in FIG. 1, the gas temperature at the turbine expander section 2 exhaust must be the oxidant temperature that is required at the SOFC module inlet 41, and for this to occur, the GT pressure ratio and turbine inlet temperature at GT rating will therefore be restricted to combinations that will result in the required module inlet temperature, or the GT must be operated off-design to achieve the required module inlet temperature. This could limit the number of commercially-available gas turbines that are suited for deployment in a ASOFC/GT system of specified capacity.

Figure 2:
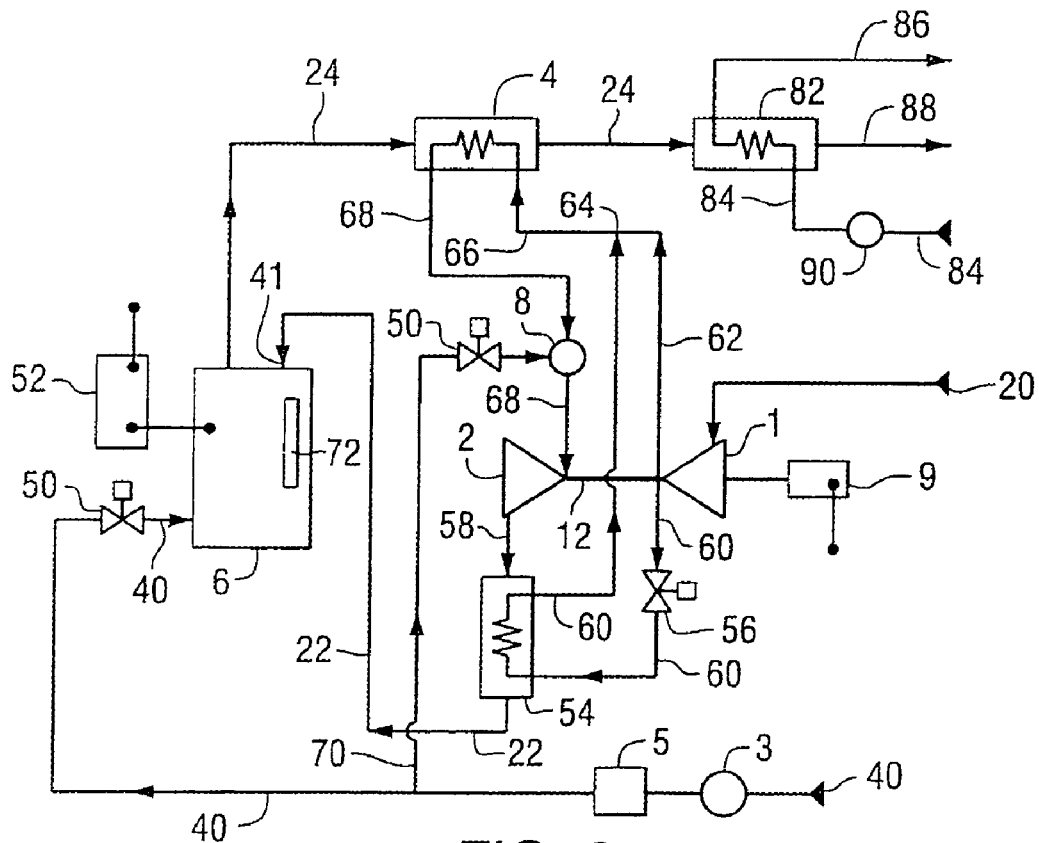
FIG. 2 is a schematic diagram of an oxidant temperature controlled ASOFC/GT power system cycle according to this invention.

Referring now to FIG. 2, which shows the new ASOFC/GT system of this invention, the addition of another recuperator 54 and the flow control valve 56 feature provides for the modulation and control of the oxidant temperature at the SOFC module inlet 41. It is possible that flow control could also be achieved by a flow control valve (not shown) in line 62. Using a module inlet temperature setpoint, the recuperator 54-flow control valve 56 would be designed to automatically adjust its position as needed to divert relatively cool compressor discharge air 60 to the recuperator 54 air inlet, and to affect the required adjustment in the recuperator 54 exit oxidant stream 22 exhaust temperature. This will cause the gas turbine operational characteristics in ASOFC/GT mode to be less dependent on SOFC module operational requirements. As a result, the method is effective to provide the system designer with more flexibility and options by increasing the number of gas turbines that are candidates for deployment in a ASOFC/GT system, and it will enable the hybrid system performance to be better optimized for high performance by weakening or eliminating the dependency of the SOFC module inlet air temperature on GT operating conditions.

Thus, in FIG. 2, a gas turbine having compressor 1 and an expander 2, has inlet oxidant (air) 20 passing into the compressor 1 and exiting as a first oxidant (air) discharge stream 60 and a second air stream 62. The first air stream 60 passes through a flow control valve 56 and into a first heat exchanger/recuperator 54, to countercurrent cool expanded exhaust stream 58, to provide adjusted air stream 22. Stream 60 then merges into the second air stream 62 at point/junction 64 to form a combined, flow controlled heated oxidant stream 66. This stream 66 is preheated due to heat it picks up at first recuperator 54 and then passes to a second heat exchanger/recuperator 4, where it is countercurrent heated by exhaust 24 from the SOFC generator to form a flow controlled further heated oxidant (air) stream 68 which is passed through a combustor 8 supplied with fuel from stream 70. Then the flow controlled further heated oxidant is passed into the expander 2 of the gas turbine to form an expanded, cooled, flow controlled oxidant "air" stream 58. When the gas turbine combustor is fired, the gas 58 exiting the expander is no longer air but it's had its oxygen concentration reduced somewhat, and it contains some $CO_2$ and more water vapor.

Figure 3:
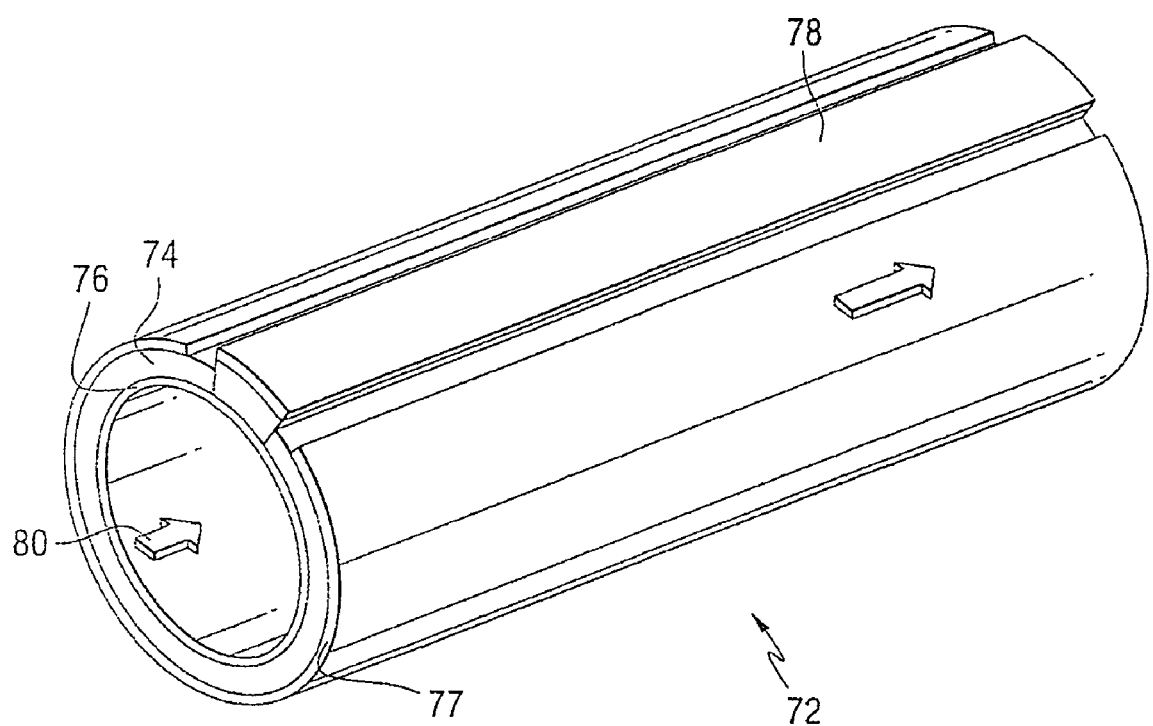
FIG. 3 is a simplified three dimensional view of a tubular solid oxide fuel cell.

Stream 58 is now relatively cool, and is passed through first heat exchanger/recuperator 54 to provide a flow-controlled, heat-adjusted feed oxidant stream 22 which is passed to the oxidant inlet 41 of a solid oxide fuel cell generator 6 containing a plurality of solid oxide fuel cells 72 (one shown for simplicity) arranged in fuel cell bundles, each fuel cell having electrodes on opposite sides of a solid oxide electrolyte, which fuel cells operate on oxidant from SOFC inlet 41 and fuel 40 to generate electricity. A simple example of a fuel cell, for example a tubular SOFC 72, is shown in FIG. 3 with electrolyte 74 air electrode 76, fuel electrode 77, interconnection 78, oxidant flow 80 and fuel flow shown as the outside arrow, as is well known in the art.

A plurality of these fuel cells can be used in a SOFC generator having means for receiving said slightly pressurized (1-3 psi gauge) air from expander exhaust, means for receiving a flow of fuel, and means for reacting at least a first portion of said received flow of fuel with said air so as to produce electrical power and a hot exhaust gas containing oxygen. The SOFC/gas turbine system contains a) a compressor/expander for producing compressed expanded air; b) a solid oxide fuel cell generator having (i) an oxidant/air inlet manifold in flow communication with the expander, (ii) a fuel inlet manifold having means for receiving a first flow of fuel, (iii) a plurality of solid oxide fuel cells in flow communication with the air inlet manifold, (iv) a reaction chamber in flow communication with the fuel inlet manifold and in which the solid oxide fuel cells are disposed, such that the solid oxide fuel cells cause fuel to react with air so as to produce electrical power and hot exhaust gas, (v) at least two oxidant flow streams (vi) at least two heat exchangers and (vii) at least one flow control valve; where the valve controls first oxidant/air flow prior to heating in a first heat exchanger and mixing with a second oxidant/air flow which mixed oxidant is passed to a second heat exchanger.

The additional recuperator 54 and flow control valve 56 hardware shown in FIG. 2 will add pressure drop to the system which will tend to reduce the system net AC power output and efficiency. However these effects can be made minimal by design by minimizing the flow resistance offered by the recuperator and the flow control equipment. The additional hardware will also increase the system cost, which will be at least partially compensated for by the elimination of restrictions on gas turbine selection and operation which could improve system power and efficiency performance.

Also, as shown in FIG. 2, high temperature SOFC exhaust 24, at about 800° C.-850° C., which is the product of depleted-fuel combustion and heat exchange with air that has entered the SOFC generator at point 41 passes through recuperator 4 countercurrent to flow controlled oxidant 66. Upon exiting recuperator 4, this exhaust may then be passed to a heat export heat exchanger 82 to heat water 84 to provide hot water 86 as well as cooled exhaust 88. Water pump 90 is also shown. Heat export heat exchanger 82 could heat water, but it could also produce steam for site use, or for use by a steam driven absorption chiller to make cooling effect, or an absorption chiller could be installed at location 82 that would operate directly on heat recovered from the hot SOFC exhaust. These heat applications would be good for small multi-hundred kWe or multi-MWe cogeneration systems for use at large office buildings, shopping centers, etc. Or, steam produced at location 82 could be used to drive a steam turbine bottoming cycle, which would make more electric power, and result in an even higher system electric efficiency. Also as shown, in first recuperator 54, first oxidant compressor discharge stream 60 is passed through flow control valve 56 and then countercurrent to expander discharge oxidant 58.

While it is true there is a need for a certain rate of air flow to the SOFC generator, that is achieved by controlling gas turbine rotational speed. Valve 56 adjusts the flow split between parallel lines 60 and 62, and is not used to achieve overall flow control at points like 22 and 41. The gas turbine operating point (speed of rotation) will set the flow (just like a pump), and the SOFC flow resistance will set the pressure at the SOFC-but it will be close to atmospheric pressure since it is known that the pressure drops through the SOFC generator and the recuperator 4 are small. Again, the invention hardware (line 60, valve 56, recuperator 54) are intended only to control temperature in line 22 and at point 41. Flow control in this invention only pertains to the flow split between lines 60 and 62. Overall control of the flow of air to the SOFC generator, as noted above, is achieved by the gas turbine speed control.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method of operating an atmospheric-pressure solid oxide fuel cell generator in combination with a gas turbine comprising a compressor and expander section; where an inlet oxidant is passed through the compressor and exits the compressor as a first oxidant stream and a second oxidant stream, the first oxidant stream passing through a flow control valve to control flow and then through a first heat exchanger, followed by mixing with the second oxidant stream to form a mixed oxidant stream; where the mixed oxidant stream is passed through a separate second heat exchanger countercurrent to fuel cell exhaust, a combustor and then the expander section of the gas turbine, which mixed oxidant-stream then passes through first heat exchanger, countercurrent to the first oxidant stream, before entry into the solid oxide fuel cell generator, which operates at a pressure of from 1.0 atmospheres to 1.2 atmospheres, which fuel cell generator is also supplied with fuel, where control of oxidant flow through the flow control valve and use of the first heat exchanger enables control of the temperature of the mixed oxidant stream at entry into the solid oxide fuel cell generator inlet, and where inlet air for the generator is also temperature controlled and wherein the temperature of the mixed oxidant stream at entry into the solid oxide fuel cell generator is between 500° C. to 700° C.

2. The method of claim 1, wherein fuel, comprising natural gas, is supplied to the combustor.

3. The method of claim 1, wherein a flow control valve is also present in the second stream.

4. The method of claim 1, wherein the method is effective to provide flexibility by increasing the number of gas turbines that are candidates for use in the method.

* * * * *